(12) United States Patent
Keigley

(10) Patent No.: US 10,501,912 B2
(45) Date of Patent: Dec. 10, 2019

(54) GRADING TOOL COMPATIBLE WITH LIGHT DUTY WORK MACHINE

(71) Applicant: ABI Attachments, Inc., Mishawaka, IN (US)

(72) Inventor: Kevin V. Keigley, Osceola, IN (US)

(73) Assignee: ABI ATTACHMENTS, INC., Mishawaka, IN (US)

( * ) Notice: Subject to any disclaimer, the term of this patent is extended or adjusted under 35 U.S.C. 154(b) by 400 days.

(21) Appl. No.: 15/434,397

(22) Filed: Feb. 16, 2017

(65) Prior Publication Data

US 2018/0230674 A1   Aug. 16, 2018

(51) Int. Cl.
*E02F 3/76*   (2006.01)
*A01B 31/00*   (2006.01)

(52) U.S. Cl.
CPC ............ *E02F 3/7677* (2013.01); *A01B 31/00* (2013.01); *E02F 3/7672* (2013.01)

(58) Field of Classification Search
CPC ..... E02F 3/7677; E02F 3/7672; E02F 3/8157; A01B 31/00
See application file for complete search history.

(56) References Cited

U.S. PATENT DOCUMENTS

| | | | |
|---|---|---|---|
| 753,452 A | 3/1904 | Van Brunt | |
| 1,333,854 A | 3/1920 | Kulker | |
| 1,856,148 A | 5/1932 | Bell | |
| 2,255,061 A * | 9/1941 | Johnson | E02F 3/7672 172/399 |
| 2,358,298 A | 1/1942 | Benjamin | |
| 2,277,880 A | 3/1942 | Noble | |
| 2,292,488 A | 8/1942 | Stevens | |
| 2,681,519 A * | 6/1954 | Potter | A01B 31/00 172/491 |
| 2,683,404 A | 7/1954 | Buhr | |
| 2,687,074 A | 8/1954 | Tanke et al. | |
| 2,692,543 A | 10/1954 | Tanke et al. | |
| 2,705,445 A | 4/1955 | Enrico | |
| 2,730,031 A | 1/1956 | Buhr | |
| 2,815,704 A | 12/1957 | Bloom | |
| 2,883,773 A * | 4/1959 | Chandler | E02F 3/6463 37/412 |
| 3,048,229 A | 8/1962 | Simpson | |
| 3,048,981 A | 8/1962 | Hing | |
| 3,101,794 A | 8/1963 | Bechman | |

(Continued)

*Primary Examiner* — Jamie L McGowan
(74) *Attorney, Agent, or Firm* — Taft Stettinius & Hollister LLP

(57) ABSTRACT

A grading tool comprises a frame extending between a hitch and a ground contacting member. A first adjustment mechanism and a lever are coupled with the frame. A suspension assembly including a spring is coupled with the lever. A grading box assembly is coupled with the frame and with the suspension assembly. The spring is compressible to accommodate motion between the lever and the grading box assembly. A second adjustment mechanism is coupled with the frame and the grading box assembly and is adjustable to selectably increase and decrease in length. A fixation member is coupled with the grading box assembly and is selectably coupleable with the frame to fix a first side of the grading box assembly vertically relative to the frame while allowing vertical movement of a second side of the of the grading box assembly relative to the frame.

20 Claims, 8 Drawing Sheets

(56) References Cited

U.S. PATENT DOCUMENTS

| | | | |
|---|---|---|---|
| 3,190,017 A | 6/1965 | Rockwell | |
| 3,305,028 A | 2/1967 | Schaper | |
| 3,448,814 A * | 6/1969 | Jackson | A01B 49/027 172/146 |
| 3,812,919 A * | 5/1974 | Baughman | A01B 63/22 172/328 |
| 3,978,597 A | 9/1976 | Brunak, Jr. | |
| 4,116,140 A | 9/1978 | Anderson et al. | |
| 4,131,162 A | 12/1978 | Schmitz | |
| 4,194,757 A | 3/1980 | Lucas et al. | |
| 4,223,742 A * | 9/1980 | Stark | A01B 29/00 172/456 |
| 4,275,670 A | 6/1981 | Dreyer | |
| 4,311,104 A | 1/1982 | Steilen | |
| 4,356,644 A | 11/1982 | Harkness | |
| 4,359,101 A | 11/1982 | Gagnon | |
| 4,396,069 A | 8/1983 | Ferber et al. | |
| 4,625,990 A | 12/1986 | Orth et al. | |
| 4,679,634 A | 7/1987 | Bulmahn | |
| 4,700,785 A | 10/1987 | Bartusek et al. | |
| 4,702,644 A * | 10/1987 | Cioffi | E01C 19/266 404/128 |
| 4,724,910 A | 2/1988 | Wheeler | |
| 4,871,026 A | 10/1989 | Bernard | |
| 4,930,580 A | 6/1990 | Fuss et al. | |
| 5,065,681 A | 11/1991 | Hadley | |
| 5,077,478 A | 12/1991 | Walford | |
| 5,366,024 A | 11/1994 | Payne | |
| 5,373,902 A | 12/1994 | Lindblom | |
| 5,413,181 A | 5/1995 | Keigley | |
| 5,417,293 A | 6/1995 | Leader | |
| 5,462,389 A | 10/1995 | Messina | |
| 5,515,625 A | 5/1996 | Keigley | |
| 5,685,245 A | 11/1997 | Bassett | |
| 5,727,638 A | 3/1998 | Wodrich et al. | |
| 5,806,606 A | 6/1998 | Robinson | |
| 5,797,460 A | 8/1998 | Parker et al. | |
| 5,806,605 A * | 9/1998 | Keigley | E02F 3/7622 172/145 |
| 5,833,012 A * | 11/1998 | Pierce | E02F 3/64 172/199 |
| 5,964,300 A | 10/1999 | Wattonville et al. | |
| 6,044,916 A | 4/2000 | Hundeby | |
| 6,431,287 B1 | 8/2002 | Ramp | |
| 6,460,623 B1 | 10/2002 | Knussman et al. | |
| 6,533,307 B1 | 3/2003 | Singh | |
| 6,606,956 B1 | 8/2003 | Paluch | |
| 6,701,857 B1 | 3/2004 | Jensen et al. | |
| 6,739,404 B2 * | 5/2004 | Keigley | A01B 31/00 172/684.5 |
| 6,745,849 B2 * | 6/2004 | Guiet | B60G 11/18 172/395 |
| 6,810,609 B2 | 11/2004 | Lassonde et al. | |
| 7,055,698 B1 | 6/2006 | Keigley | |
| 7,066,275 B1 | 6/2006 | Keigley | |
| 7,093,380 B2 | 8/2006 | Hubscher et al. | |
| 7,478,682 B1 | 1/2009 | Keigley | |
| 7,540,331 B1 | 6/2009 | Keigley | |
| 7,743,844 B2 | 6/2010 | Kovach et al. | |
| 7,975,776 B2 | 7/2011 | Chimento et al. | |
| 8,047,299 B2 | 11/2011 | Hurtis | |
| 8,286,566 B2 | 10/2012 | Schilling | |
| 8,555,798 B2 | 10/2013 | Schilling | |
| 8,646,798 B2 * | 2/2014 | Van Den Engel | A01B 63/145 280/414.5 |
| 8,770,309 B2 | 7/2014 | Bauer | |
| 8,944,176 B2 | 2/2015 | Kiser | |
| 8,992,119 B2 * | 3/2015 | Parsons, Jr. | E01C 23/065 404/91 |
| 9,332,687 B2 * | 5/2016 | Keigley | A01B 63/008 |
| 10,039,222 B1 * | 8/2018 | Keigley | E02F 3/7663 |
| 10,287,744 B1 * | 5/2019 | Keigley | E02F 3/844 |
| 10,287,745 B1 * | 5/2019 | Keigley | E02F 3/844 |
| 2001/0045294 A1 | 11/2001 | Mayerle et al. | |
| 2003/0164125 A1 | 9/2003 | Paluch et al. | |
| 2003/0164126 A1 | 9/2003 | Paluch et al. | |
| 2004/0050564 A1 | 3/2004 | Wilson | |
| 2005/0098327 A1 | 5/2005 | Williams et al. | |
| 2006/0118313 A1 | 6/2006 | Nicholas | |
| 2008/0011496 A1 | 1/2008 | Garrison et al. | |
| 2008/0142233 A1 | 6/2008 | Hurtis | |
| 2008/0236850 A1 | 10/2008 | Hawkes | |
| 2009/0071666 A1 | 3/2009 | Ehrhart et al. | |
| 2010/0078185 A1 | 4/2010 | Carlz | |
| 2011/0083867 A1 | 4/2011 | Leith | |
| 2011/0120357 A1 | 5/2011 | Schilling et al. | |
| 2011/0313572 A1 | 12/2011 | Kowalchuk et al. | |
| 2012/0234565 A1 | 9/2012 | Kiser | |
| 2012/0298388 A1 | 11/2012 | Bauer | |
| 2013/0264080 A1 | 10/2013 | Keigley | |
| 2014/0147207 A1 * | 5/2014 | Parsons, Jr. | E01C 23/065 404/91 |
| 2015/0107861 A1 * | 4/2015 | Keigley | A01B 63/108 172/1 |
| 2016/0194853 A1 * | 7/2016 | Sawatsky | E02F 9/024 172/799.5 |
| 2018/0251951 A1 * | 9/2018 | Stonum | E02F 3/7677 |
| 2019/0040606 A1 * | 2/2019 | Armstrong | E02F 3/7627 |

* cited by examiner

GRADING TOOL COMPATIBLE WITH LIGHT DUTY WORK MACHINE

BACKGROUND

The present application relates generally to grading tools and more particularly, but not exclusively to tow-behind grading tools which are compatible with light duty work machines. A number of grading tools have been proposed. Heretofore, grading tools options for light duty work machines have been limited by a number of factors including the rated horsepower of light duty work machines, the load imposed by the weight of ground surfaces which are worked during grading operations and the limited adjustability and limited responsiveness of conventional grading tools among other factors. There remains a substantial need for the unique apparatuses, systems and methods disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment is a unique two-behind grading tool compatible with light duty work machines. Another embodiment is a unique apparatus comprising a grading tool. A further embodiment is a unique method of operating a grading tool. Other embodiments, forms, objects, features, advantages, aspects, and benefits shall become apparent from the following description and drawings.

DETAILED DESCRIPTION OF ILLUSTRATIVE EMBODIMENTS

Figure 1:
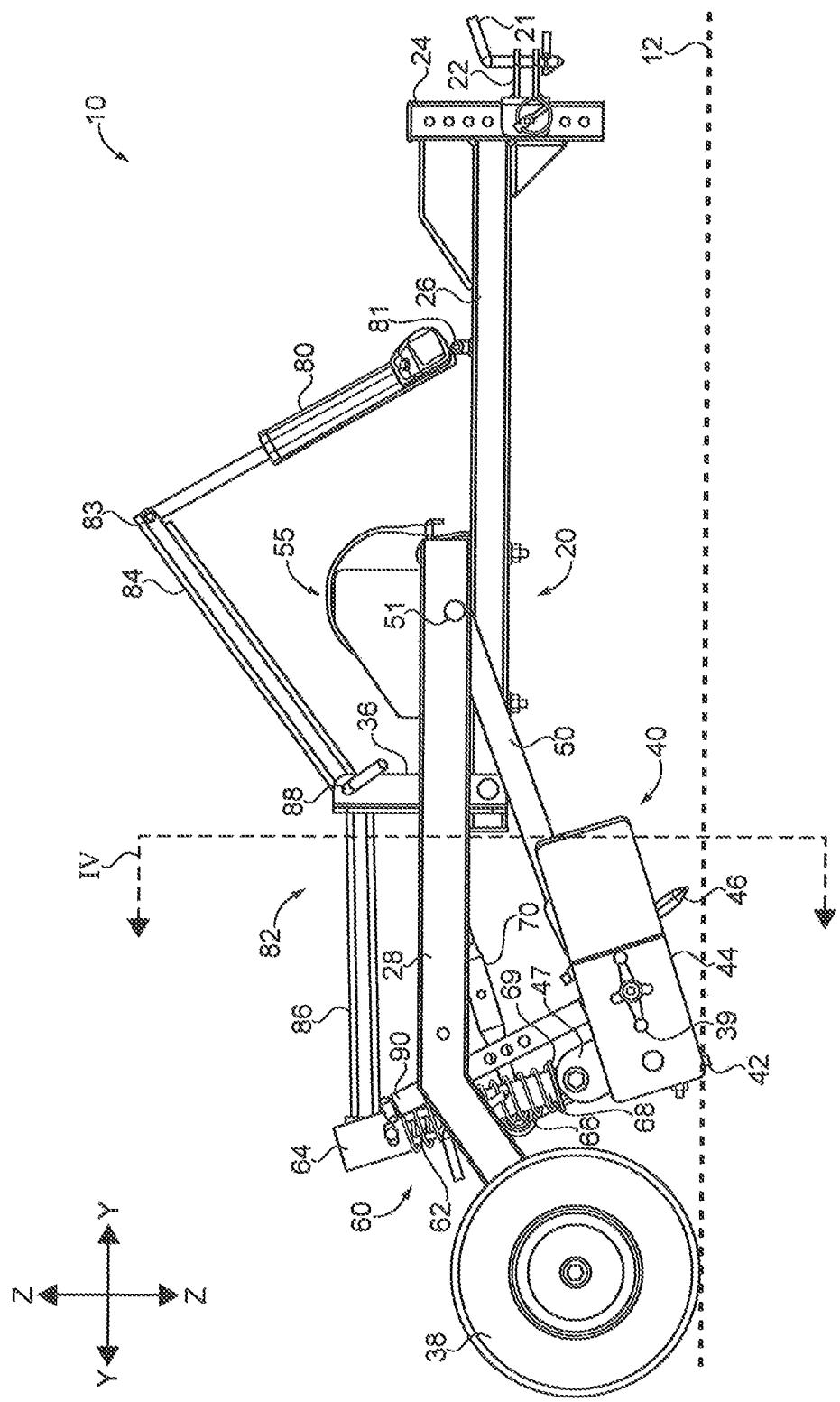
FIG. 1 is a side view of a grading tool in one state of adjustment.
Figure 2:
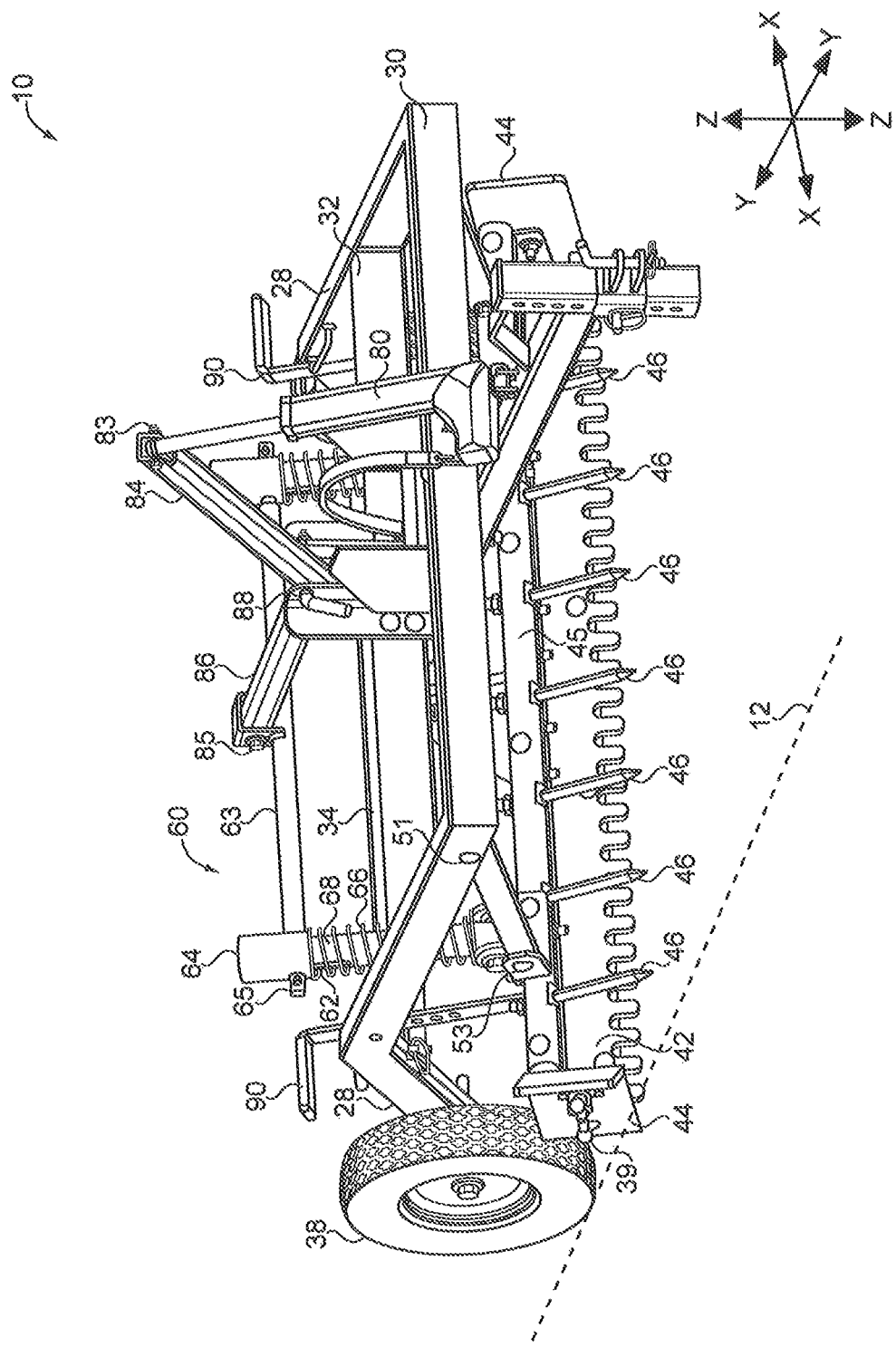
FIG. 2 is a perspective view of the grading tool of FIG. 1.

With reference to FIGS. 1-4 there are illustrated side, perspective, top and front sectional views of an exemplary grading tool 10 in one state of adjustment. Grading tool 10 is configured as a tow-behind grading tool adapted to be compatible with a light duty work machine such as a riding lawnmower, light duty lawn tractor or light duty garden tractor. As used herein, light duty work machines refer to work machines with engines or other prime movers rated at 25 horsepower or less and sometimes 18 horsepower or less. Light duty work machines may have a nominal weight of 900 pounds or less and sometimes 600 pounds or less. It shall be appreciated that grading tool 10 is also compatible with and can also be utilized and operated in connection with work machines with a greater rated horsepower than that of light duty work machines and/or a greater nominal weight than that of light duty work machines. Grading tool 10 may be used to grade a variety of ground surfaces. Non-limiting examples of preferred ground surfaces which grading tool 10 may be used to grade include gravel surfaces such as gravel driveways, roads and lots, stone or aggregate surfaces, and soil or earth surfaces, among others.

Grading tool 10 includes frame assembly 20 which extends between hitch 22 and ground contacting members 38. Frame assembly 20 includes hitch height adjustment member 24, tongue arm member 26, first and second side members 28, front cross member 30, middle cross member 32, rear cross member 34, fulcrum member 36 and battery mount 55. Hitch 22 is coupled with height adjustment member 24 by a retaining pin which passes through one of a plurality of openings provided in height adjustment member 24. The height of hitch 22 can be adjusted vertically by removing the retaining pin, adjusting the height of hitch 22 upward or downward and reinserting the retaining pin to pass through a different one to the plurality of openings provided in height adjustment member 24 corresponding to the new height of hitch 22. Hitch 22 is structured to couple grading tool 10 to work machine with a connection pin 21 that passes through openings in hitch 22 and a corresponding hitch structure of the work machine. It shall be appreciated that hitch 22 may be provided in a number of alternative forms including ball-coupling members and hook coupling members among others.

Ground contacting members 38 are rotatably coupled with respective side members 28 toward the rear of frame assembly 20 and, in the illustrated embodiment, constitute a rear extremity of grading tool 10. In other embodiments frame assembly 20 may include structures which extend further rearward from ground contacting members 38. Ground contacting members 38 are in contact with and supported by underlying ground surface 12. In the illustrated embodiment ground contacting members 38 are provided as wheels with pneumatic tires. It shall be appreciated that ground contacting members 38 may also be provided in other forms, including other types of wheels such as solid tire wheels, a roll cage, a roll drum, and other types of rotatable structures.

It shall be appreciated that frame assembly 20 is one exemplary embodiment of a frame that may be utilized in connection with grading tool 10. Additional embodiments contemplate frames in which one or more of the aforementioned features of frame assembly 20 is omitted or replaced with alternative structures while still providing a frame structure with which various other assemblies and components, such as those disclosed herein, may be coupled.

Grading tool 10 includes grading box assembly 40 which is adjustably coupled with pull arms 50 and suspension assembly 60. Pull arms 50 are rotatably coupled with grading box assembly 40 by connectors 53 and rotatably coupled with side members 28 by connectors 51 allowing the pitch and elevation of grading box assembly to be varied independently from one another or varied concurrently as desired. Grading box assembly 40 includes top member 41, drag bar 42, side members 44, front member 45, ripping teeth 46, suspension coupling members 47 and pitch adjustment coupling member 49. Top member 41 is provided with openings 43 which allow for the release of accumulated loosened ground material to mitigate potential overloading of grading box assembly 40 during operation as grading tool 10 is advanced along underlying ground surface 12 in a forward direction, i.e. to the right of FIG. 1 when viewed in landscape orientation.

Drag bar 42 is coupled with top member 41 at a rearward location of grading box assembly 40 and extends downward from top member 41 toward underlying ground surface 12. Side members 44 are positioned at first and second side locations of grading box assembly 40 and extend forward from drag bar 42 and downward from top member 41 toward underlying ground surface 12. Front member 45 is coupled with top member 41 at a forward location of grading box assembly 40. Ripping teeth 46 are inserted into openings in front member 45 and extend downward therefrom toward underlying ground surface 12. Suspension coupling members 47 are coupled with top member 41 at spaced apart locations and provide a rotatable coupling with suspension assembly 60. Pitch adjustment coupling member 49 is rotatably coupled with adjustment mechanism 70 at a central location. Fixation members 90 are coupled with and extend upward from grading box assembly 40 and may be selectably connected or disconnected with frame assembly 20 to selectably adjust the roll, i.e. the side-to-side tilting of grading box assembly as further described in connection with FIG. 8. In the illustrated embodiment fixation members 90 are provided as handles which are rotatably coupled with grading box assembly such that they can accommodate rotation of grading box assembly 40 to allow changes in front-to-back pitch of grading box assembly 40 while concurrently vertically fixing grading box assembly 40 relative frame assembly 20 to provide side-to-side tilt adjustability as further described in connection with FIG. 8 and while maintaining their orientation relative to frame assembly 20. In other embodiments, fixation members may include other fixation member structures such as hooks, brackets, clamps, set pins and combinations thereof.

Figure 3:
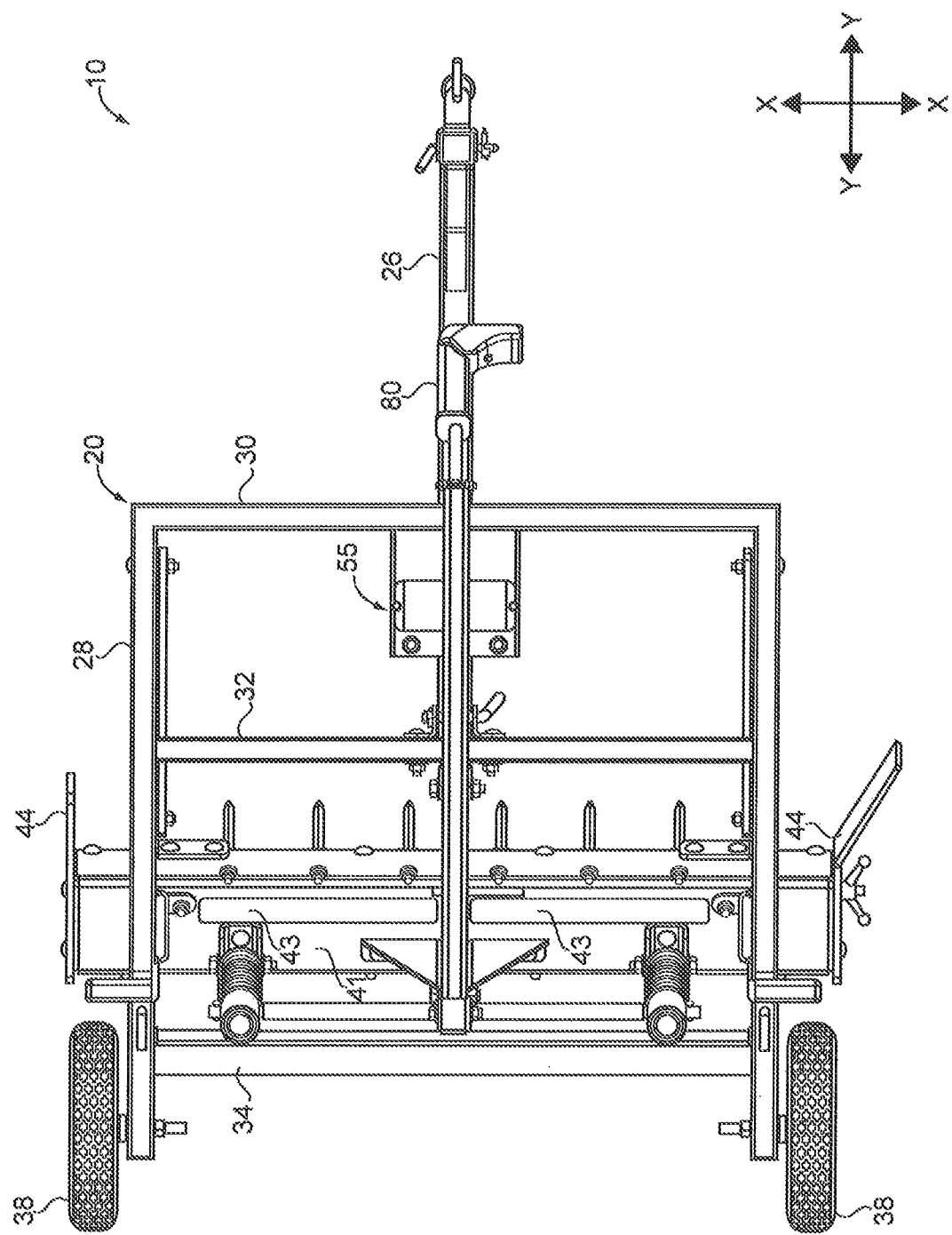
FIG. 3 is a top view of the grading tool of FIG. 1
Figure 4:
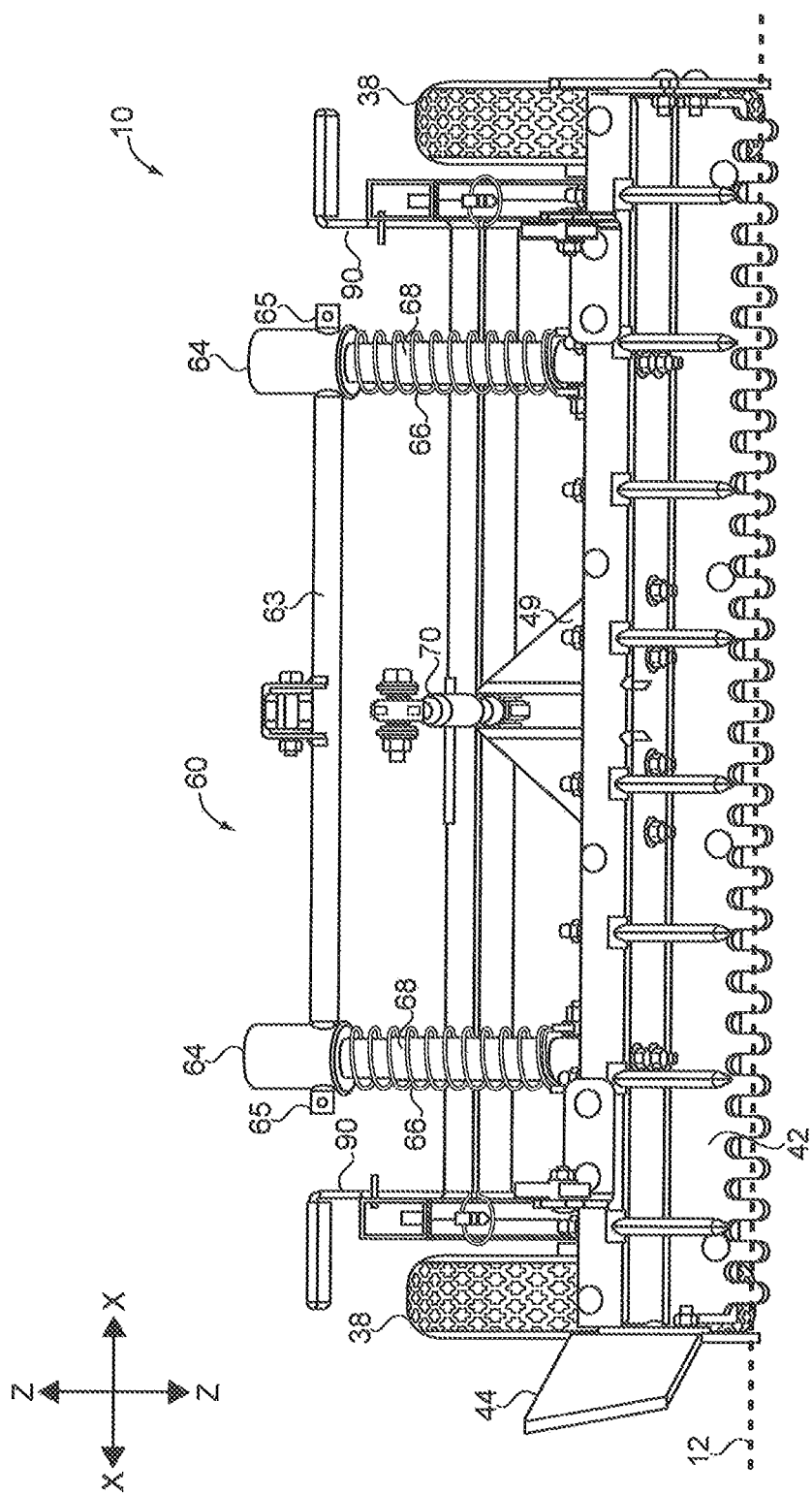
FIG. 4 is a front sectional view of the grading tool of FIG. 1 along the section indicated by dashed line IV.

As illustrated in FIG. 3 one of side members 44 includes a forward outward flare portion, sometimes referred to as a wing portion, which is structured to capture gravel or other ground surface material located proximate a side of grading box assembly 40 and guide such material into grading box assembly 40 as grading tool 10 is advanced in a forward direction. The flared side member 44 is coupled with grading box assembly by a wing nut 39 for ease of operator adjustability. The other side member 44 is illustrated as straight side member. An operator may switch the positions of the side members 44 in order to provide a flared side member on the opposite side of grading box 44. In other forms both of side members 44 may be flared or both may be straight.

It shall be appreciated that grading box assembly 40 is one exemplary embodiment of a grading box that may be utilized in connection with grading tool 10. Additional embodiments contemplate grading boxes in which one or more of the aforementioned features of grading box assembly 40 is omitted or replaced with alternative structures while still providing the preferred attributes of a grading box, namely, the ability to loosen an underlying ground surface, contain and transport loosened ground surface and thereby adjustably level or grade the underlying ground surface.

Grading tool 10 includes suspension assembly 60 which includes lateral member 63, moveable collars 64, shafts 68, springs 66 and fixed collars 69. Springs 66 are retained between moveable collars 64 and fixed collars 69 and can compress and decompress as moveable collars 64 move along the length of shafts 68. Lateral member 63 includes end studs 65 which pass through openings in moveable collars 64 and through slots 62 provided in shafts 68 and are secured in place with transverse bolts. As moveable collars 64 travel along the length of shafts 68, end studs 65 travel along the length of slots 62 until they encounter the ends of slots 62 which limits their movement. Studs 65 are also able to tilt within the confines of slots 62 which accommodates side-to-side roll of grading box assembly 40 as further described in connection with FIG. 8.

It shall be appreciated that suspension assembly 60 is one exemplary embodiment of a suspension assembly that may be utilized in connection with grading tool 10. Additional embodiments contemplate suspension assemblies in which one or more of the aforementioned features of grading box assembly 40 is omitted or replaced with alternative structures.

Figure 6:
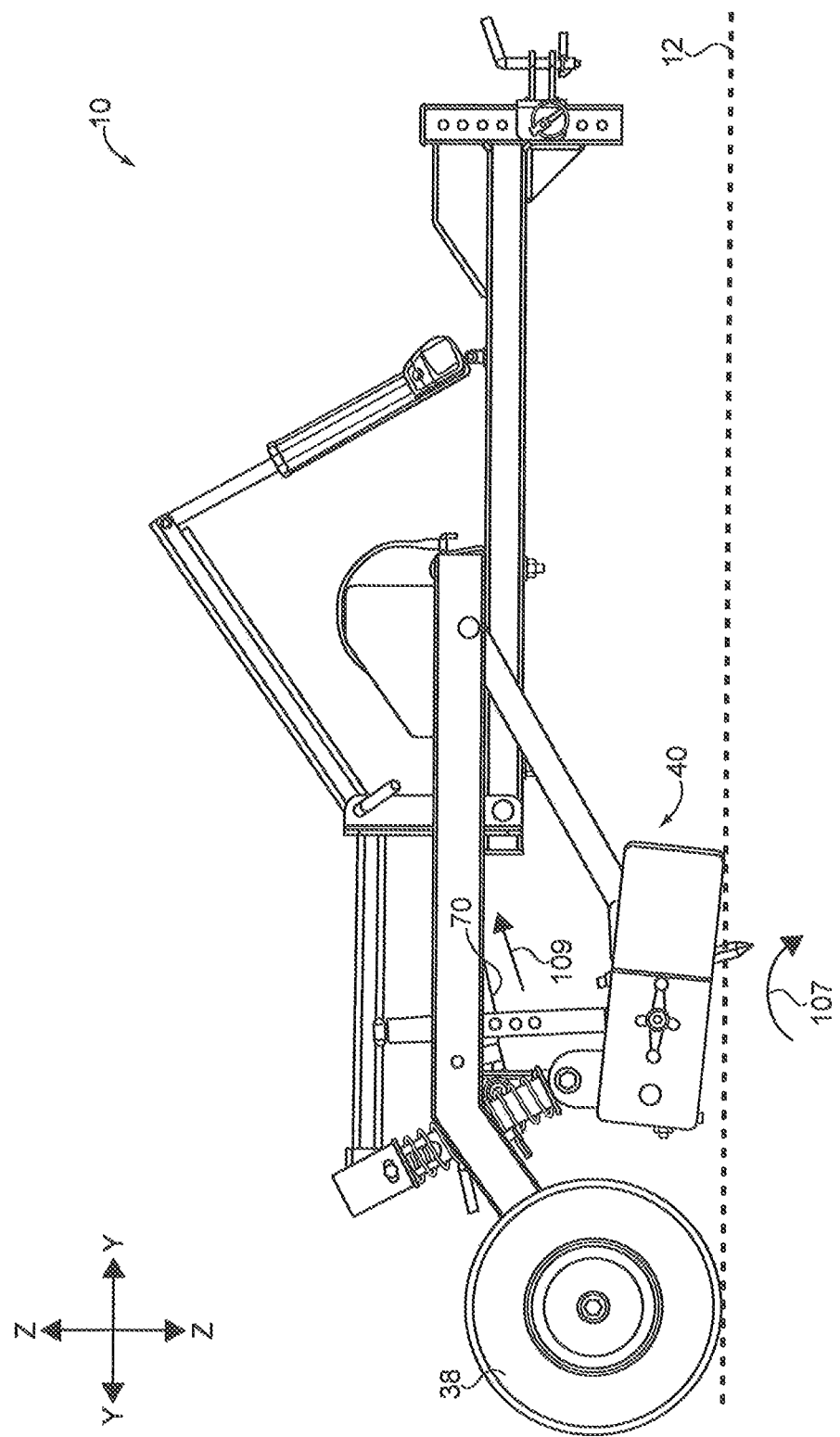
FIG. 6 is a side view of the grading tool of FIG. 1 in a further state of adjustment.

Grading tool 10 includes adjustment mechanism 70 which is rotatably coupled with and extends between middle cross member 32 and adjustment coupling member 49. Adjustment mechanism 70 is adjustable to vary its length which is effective to adjust the front-to-rear pitch of grading box assembly 40. When the length of adjustment mechanism 70 decreases the front-to-rear pitch of grading box assembly 40 increases. The increase in front-to-rear pitch can occur as grading box assembly rotates forward relative to the position illustrated in FIG. 1, for example, to the position illustrated in FIG. 6 in the direction indicated by arrow 107. When the length of adjustment mechanism 70 increases the front-to-rear pitch of grading box assembly 40 decreases. The increase in pitch can occur as grading box assembly rotates forward relative to the position illustrated in FIG. 1. A further example of rotation to increase front-to-rear pitch is provided by increasing the length of adjustment mechanism 70 to rotate grading box assembly from the pitch illustrated in FIG. 6 to the pitch illustrated in FIG. 1. The front-to-rear pitch adjustment of grading box assembly may be performed independently from with the other adjustments disclosed herein or may be performed in combination therewith.

By varying the front-to-rear pitch of grading box assembly 40, either one or both of drag bar 42 and ripping teeth 46 may be brought into or out of engagement with the underlying ground surface 12 and the degree of their respective engagement at a given height adjustment of grading box 40 can also be varied. This adjustability offers control over the degree to which ripping teeth 46 will act to loosen the underlying ground surface 12 by ripping action as the grading tool advances in a forward direction. This adjustability also offers control over the degree to which loose ground surface will be carried forward by drag bar 42 and side members 44 as grading tool 10 advances in a forward direction and the degree to which drag bar 42 will work the underlying ground surface during forward movement of grading tool 10.

In the illustrated embodiment adjustment mechanism 70 is provided as a top link whose length can be selectably increased or decreased by an operator rotating a central member. In other embodiments other types of adjustment mechanisms whose length can be selectably increased and decreased are utilized. In further embodiments other types of adjustment mechanisms structured to provide the forces and adjustability described herein may also be used.

Grading tool 10 includes adjustment mechanism 80 which is rotatably coupled with tongue member 26 of frame assembly 20 by connector 81 and is rotatably coupled with arm 84 of lever mechanism 82 by connector 83. Adjustment mechanism 80 is adjustable to vary its length which is effective to adjust the position of and force applied to lever mechanism 82 and, in turn, to adjust the position of and force applied to suspension assembly 60 and/or to adjust the elevation of grading box assembly 40. Lever mechanism 82 include arm 84 and arm 86 which are rotatably coupled with fulcrum member 36 by connector 88 to establish a fulcrum point of rotation for lever mechanism 82. Arm 84 is rotatably coupled with lateral member 63 of suspension assembly 60 by connector 85.

Figure 7:
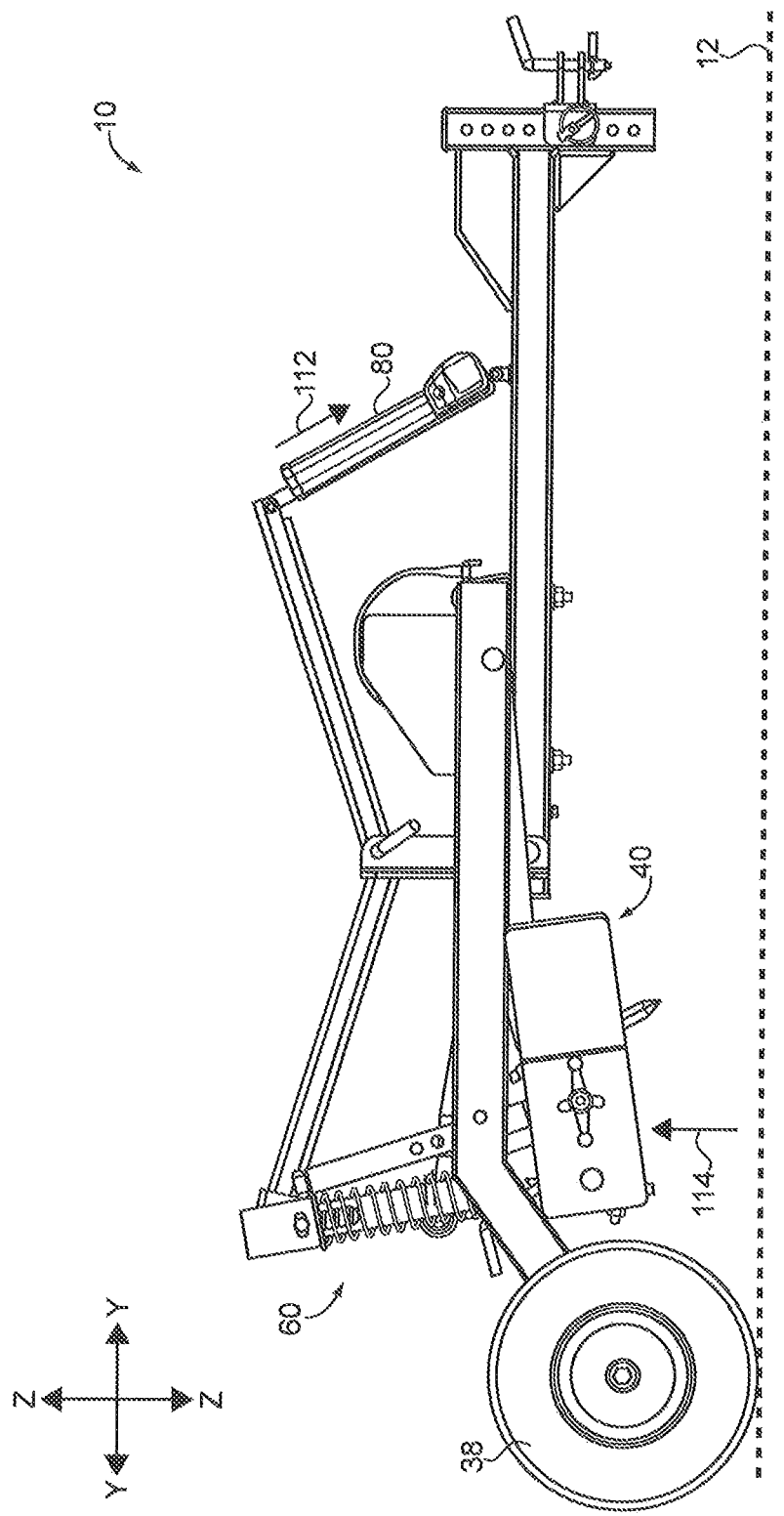
FIG. 7 is a side view of the grading tool of FIG. 1 in an additional state of adjustment.

When the length of adjustment mechanism 80 decreases lever mechanism 82 rotates forward, i.e. clockwise in the view of FIG. 1, and upward force is applied to lateral member 63 of suspension assembly 60. When the length of adjustment mechanism 80 increases lever mechanism 82 rotates rearward, i.e. counterclockwise in the view of FIG. 1, and downward force is applied to lateral member 63 of suspension assembly 60. By adjusting the length of adjustment mechanism 80 the elevation of grading box assembly 40 can be adjusted. For example, starting from the state of adjustment illustrated in FIG. 1, the length of the adjustment mechanism 80 can be shortened to raise the grading box 40 to the position illustrated in FIG. 7 in which arrow 112 indicates the direction of length decrease of adjustment mechanism 80 and arrow 114 indicates the direction of elevation increase of grading box assembly 40.

By adjusting the length of adjustment mechanism 80 the force applied to suspension assembly 60 can be adjusted. When the length of adjustment mechanism 80 increases lever mechanism 82 rotates rearward and downward force is applied to lateral member 63 of suspension assembly 60. When the grading box 40 encounters the underlying ground surface 12 or another source of resistance, additional downward force applied to lateral member 63 by additional rotation of lever mechanism causes later member 63 and moveable collars 64 to travel downward along shaft 68 while fixed collars 69 remain stationary thereby compress springs 66 between respective moveable collars 64 and fixed collars 69. In the illustrated embodiment, springs 66 are provided as compressible coil springs. Other embodiments may utilize other types of spring structure including, as flat springs, cantilevered springs, volute springs, elastomer springs, gas springs, fluid springs.

In the illustrated embodiment adjustment mechanism 80 is provided as an electrically actuated piston whose length can be selectably increased or decreased by a wired or wireless command signal received by adjustment mechanism 80. In this embodiment, adjustment mechanism 80 includes an electric motor which may be powered by either an electrical connection with a work machine or by an on-tool battery which may be secured to battery mount 55. In further embodiments manually actuated adjustment mechanisms may be utilized. Examples of manually actuated adjustment mechanisms include lever mechanisms which can be manually adjusted to increase or decrease in length be and can be pinned or fixed to a bracket at a desired length allowing the length of the mechanism to be selectably varied, ratchet type mechanisms, and other mechanisms structured to provide manual movement and selectable fixation of one member relative to another to provide adjustment in length. In other embodiments other types of adjustment mechanisms whose length can be selectably increased and decreased are utilized. In further embodiments other types of adjustment mechanisms structured to provide the forces and adjustability described herein may also be used.

As illustrated in FIGS. 1-4, first adjustment mechanism 70 and second adjustment mechanism 80 are adjusted to provide grading tool 10 in one state of adjustment wherein grading box assembly 40 is positioned at a first angle and a first height relative to underlying ground surface 12 such that ripping teeth 46 and drag bar 42 engage and penetrate a first distance into underlying ground surface 12. Adjustment mechanism 70 and adjustment mechanism 80 can be adjusted to provide numerous other states of adjustment, illustrative examples of which are illustrated in FIGS. 5-8.

Figure 5:
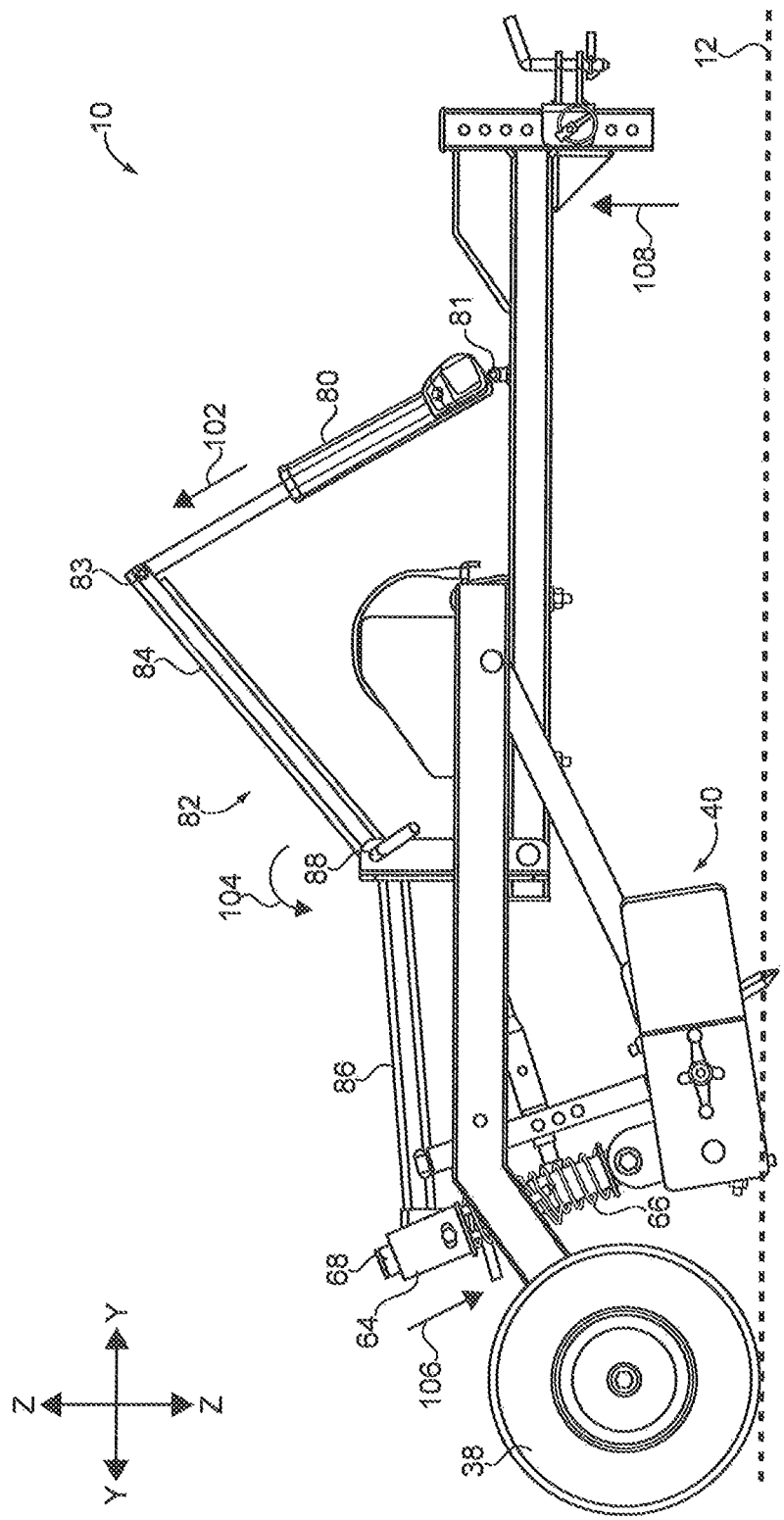
FIG. 5 is a side view of the grading tool of FIG. 1 in another state of adjustment.

With reference to FIG. 5 there is illustrated another exemplary state of adjustment of grading tool 10 wherein adjustment mechanism 80 has been extended or lengthened in the direction indicated by arrow 102. Extension or lengthening of adjustment mechanism 80 causes rotation of lever mechanism 82 in the direction indicated by arrow 104 about a fulcrum point established by the rotatable connection of lever mechanism 82 with fulcrum member 36 by connector 88. Rotation of lever mechanism 82 causes arm 86 to apply force including a downward force component to lateral member 63 of suspension assembly 60 in the direction indicated by arrow 106. Up to the point where grading box assembly 40 contacts underlying ground surface 12 force applied to lateral member 63 in the direction indicated by arrow 106 causes grading box assembly to lower, for example, from the position of FIG. 7 downward toward a position similar to that illustrated in FIG. 6. It shall be appreciated that retraction or shortening of adjustment mechanism in a direction opposite of that indicated by arrow 102 causes rotation of lever mechanism 82 in the direction opposite of that indicated by arrow 104 and causes arm 86 to apply force including a upward force component to lateral member 63 of suspension assembly 60 in the direction opposite that indicated by arrow 106. By application of such force grading box assembly 40 can be raised, for example, from a position similar to that illustrated in FIG. 6 to the position illustrated in FIG. 7.

Once grading box assembly encounters underlying ground surface 12, force applied to lateral member 63 in the direction indicated by arrow 106 compresses springs 66 while downward motion of adjustment mechanism 80 is limited by contact with the underlying ground surface 12. At this point, the downward force and effective weight applied to grading tool 40 can be adjusted by further extension or lengthening of adjustment mechanism 80. Additionally, such application of force is evident by the protrusion of shafts 68 above moveable collars 64. This visibility provides an operator-perceptible indication that allows the downward force being applied grading box 40 to be gauged. Shafts 68 can be provided with markings at predetermined positions to aid in gauging downward force or effective weight. It shall be further appreciated that variation in the underlying ground surface, such as elevation changes or the presence of obstacles, spoils or compacted areas, is accommodated by compression of springs 66 due to upward force applied by such variations as the grading tool 10 travels forward during operation. This accommodation mitigates the possibility of the grading tool being bogged down or stalling forward operation of the work machine towing grading tool 10. It shall be appreciated that from the position illustrated in FIG. 5, retraction or shortening of adjustment mechanism in a direction opposite of that indicated by arrow 102 decreases the downward force component on lateral member 63 of suspension assembly 60 causing a change in operator-perceptible indication that allows the change in downward force being applied grading box 40 to be gauged.

The force applied force applied to lateral member 63 in the direction indicated by arrow 106 to increase downward force allows the weight of the work vehicle to which grading tool 10 is coupled to be used effectively as weight on grading box assembly 40. Force applied by grading box assembly 40 to the underlying ground surface 12 in the direction indicated by arrow 106 causes upward force to be applied by hitch 22 to the work machine coupled with grading tool 10. The relative positioning of hitch 22, connector 51, connectors 81, 83, 85 and 88 of lever mechanism 82 and ground contacting members is effective to provide negative tongue weight at or proximate the location of hitch 22. Frame assembly 20 and lever mechanism 82 provide a double fulcrum mechanism in which the fulcrum of lever assembly 82 at the location of connector 82 provides one fulcrum and the axis of rotation of ground contacting members 38 relative to frame assembly 20 provides another fulcrum. Through action of the double fulcrum mechanism increasing downward force on to grading box assembly 40 provides increased upward force on hitch 22 which is opposed by the weight of the work machine to effectively use the work machine as weight on the grading box assembly 40.

Figure 8:
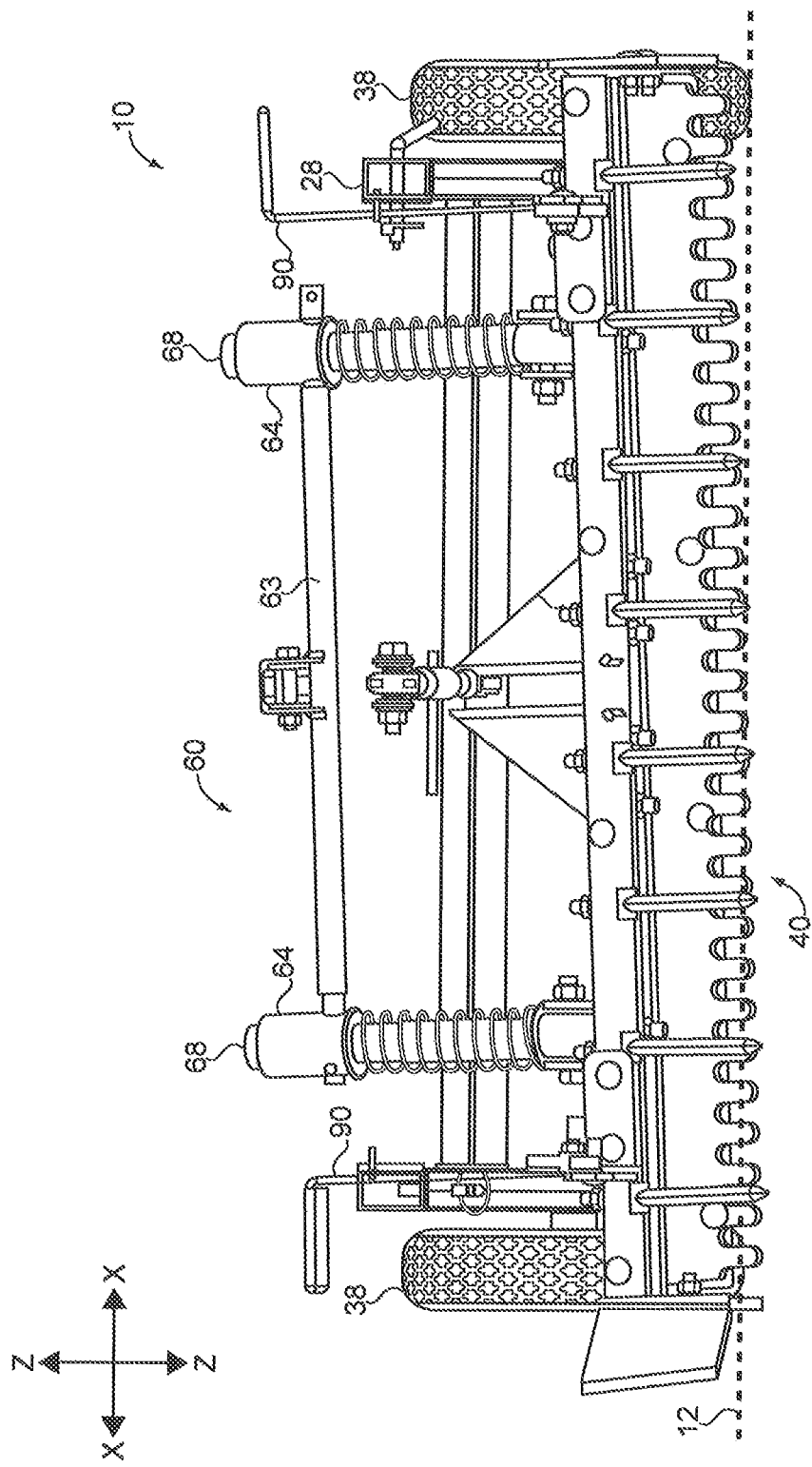
FIG. 8 is a front sectional view of the grading tool of FIG. 1 in a yet another state of adjustment along a section similar to that indicated by dashed line IV.

With reference to FIG. 8 there is illustrated a front sectional view of grading tool 10 in a yet another exemplary state of adjustment. In the view of FIG. 8, the fixation member 90 on the right side of grading tool 10 is coupled with side member 28 of frame assembly 20 by connection pin 91 which passes through respective apertures formed in the right hand side member 28 and right hand fixation member 90. In contrast, the fixation member 90 on the left side of grading tool 10 is not coupled with and is free to move relative to frame assembly 20. One or both of fixation members 90 may be provided with multiple apertures at different heights to provide selectably different fixed positions of grading box assembly 40 relative to frame assembly 20 by coupling one of fixation members 90 to frame assembly 20 with a connector such as connection pin 91 while allowing the other of fixation members 90 to move freely relative to the frame assembly 90.

By selectably coupling one or the other of fixation members 90 to a frame assembly 20 at a desired position, side-to-side roll adjustment of grading box assembly 40 including drag bar 42 can be provided. For example, starting from a position similar to that illustrated in FIG. 4, extension or lengthening of adjustment member 80 with the right side fixation member 90 coupled with frame assembly 20 will result in the lowering of the left side of grading box assembly 40 into contract with underlying grounds surface 12 while limiting downward movement of the right hand side grading box assembly 40 relative to frame assembly 20. Through such adjustment grading box assembly 40 and suspension assembly 60 can be provided in the state of adjustment shown in FIG. 8. To accommodate such adjustment, end studs 65 which pass through openings in moveable collars 64 and through slots 62 provided in shafts 68 may travel different distances along the slots 62 in their respective shafts 68, permitting grading box assembly to change pitch by tilting from side-to-side as adjustment member 80 is lengthened while still providing the force application and force absorption structural characteristics described herein.

It shall be appreciated that the orientation of end studs 65 within slots 62 may rotate in the X-Z plane allowing the orientation of lateral member 63 to change relative to that of grading box assembly 40. Thus, for example, when less compression force is applied to springs 66, the left hand moveable collar 64 may travel upward relative to the position illustrated in FIG. 8 while the right hand moveable collar 64 remains in the position illustrated in FIG. 8 by virtue of its being fixed relative to frame assembly 20 by the right-hand fixation member 90. In such a state of adjustment lateral member 63 may be parallel to underlying ground surface 12 whereas in FIG. 8 it is generally parallel to a top surface of grading box assembly 40. Furthermore, when greater compression force is applied to springs 66, the left hand moveable collar may travel downward relative to the position illustrated in FIG. 8 while the right hand moveable collar 64 remains in the position illustrated in FIG. 8 by virtue of its being fixed relative to frame assembly 20 by the right-hand fixation member 90. In such a state of adjustment, lateral member 63 may be at a steeper angle relative to underlying ground surface 12 whereas in FIG. 8 it is generally parallel to a top surface of grading box assembly 40. Furthermore, in other embodiments lateral member 63 may be coupled with moveable collars 64 by alternative structures such as hinges or joints permitting the adjustability disclosed herein. Such embodiment may omit or may include end studs 65 and slots 62.

It shall be further appreciated that the coupling between fixation members 90 and grading box assembly 40 may be rotatable to accommodate front-to-rear pitch adjustments of grading box assembly such as described herein. It shall also be appreciated that fixation members 90 are examples of adjustment mechanisms that can be selectably engaged and disengaged with a frame element of grading tool 10 to limit movement of a portion of grading box assembly in response to adjustment of adjustment member 80.

The state of adjustment illustrated in FIG. 8 may be used in connection with a number of grading operations. One preferred grading operation is crowning an underlying ground surface such as a gravel driveway to provide higher elevation middle portion and sloping side portions to promote the drainage of water and mitigate the formation of potholes. Further exemplary grading operations including creating slopes or inclines in graded surfaces. It shall be further appreciated that the present disclosure contemplates a number of additional and alternate methods of operating grading tool 10. Such methods may include adjusting the grading tool 10 to selected configurations such as those illustrated in FIGS. 1-8 as well as configurations involving other combinations or ranges of the adjustment features disclosed herein and towing grading tool 10 behind a work machine such as a light duty work machine to work an underlying ground surface in accordance with the state of adjustment. Such methods may additionally or alternatively include changing the configuration of grading tool 10 to an alternate configuration and towing grading tool 10 behind a work machine such as a light duty work machine to work an underlying ground surface in accordance with the alternate configuration.

It shall be appreciated that the positioning of various elements described herein may be described relative to an X-Y-Z coordinate system illustrated with arrows in the FIGS. 1-8 wherein the forward and reverse or front to back directions correspond to the Y-axis direction, the side to side or lateral directions corresponds to the X-axis direction and the upward and downward or vertical directions correspond to the Z-axis direction. It shall be further appreciated that underlying ground surface 12 illustrated as an idealized planar surface for purposes of illustration and that in actual use variation in elevation of the underlying ground surface is to be expected.

Further illustrative embodiments shall now be described. One embodiment is a tow-behind grading tool comprising a frame extending between a hitch coupled with the frame at a forward frame location and a ground contacting member rotatably coupled with the frame at a rearward frame location; a first adjustment mechanism rotatably coupled with the frame at a first frame location intermediate the forward frame location and the rearward frame location and being adjustable to increase and decrease in length; a lever rotatably coupled with the frame at a second frame location intermediate the first frame location and the rearward frame location, the lever including a first arm extending from a fulcrum at the second frame location and rotatably coupled with the first adjustment mechanism and a second arm extending from the fulcrum; a suspension assembly rotatably coupled with the second arm of the lever, the suspension assembly including a spring operably coupled with the lever; a grading box assembly rotatably coupled with the frame at a third frame location intermediate the forward frame location and the rearward frame location and rotatably coupled with the suspension assembly, the spring being compressible to accommodate relative motion between the lever and the grading box assembly; a second adjustment mechanism coupled with the frame, coupled with the grading box assembly and being adjustable to selectably increase and decrease in length effective to vary front-to-rear pitch of the grading box assembly relative to the frame; a fixation member coupled with the grading box assembly and engageable with the frame to selectably fix a first side of the grading box assembly vertically relative to the frame while allowing vertical movement of a second side of the of the grading box assembly relative to the frame.

In some forms of the tow-behind grading tool, with the ground contacting member in contact with an underlying ground surface and the fixation member coupled with the frame, adjustment of the length of the first adjustment mechanism is effective to vary a side-to-side roll of the grading box assembly. In some forms of the tow-behind grading tool the suspension comprises first and second shafts rotatably coupled with the grading box assembly, first and second slots provided in the first and second shafts respectively, first and second moveable collars moveable along a length of the first and second shafts respectively, first and second springs surrounding the first and second shafts respectively, and a lateral member passing through openings in the first and second moveable collars, passing through the first and second slots and rotatably coupled with the lever. In some forms of the tow-behind grading tool, with the ground contacting member in contact with an underlying ground surface, adjusting the length of the first adjustment mechanism over a first range is effective to raise and lower the grading box assembly relative to the underlying ground surface from a first position wherein the grading box assembly is spaced apart from the underlying ground surface to a second position wherein the grading box assembly contacts the underlying ground surface. In some forms of the tow-behind grading tool, with the ground contacting member in contact with an underlying ground surface and the grading box assembly in contact with the underlying ground surface, adjusting the length of the first adjustment mechanism over a second range is effective to compress the spring of the suspension assembly. In some forms of the tow-behind grading tool adjusting the length of the first adjustment mechanism over a second range to compress the spring is effective to apply upward force to the hitch. In some forms of the tow-behind grading tool, during towing by a work machine carrying an operator, the upward force on the hitch is effective transfer weight of the work machine and weight of the operator to downward force applied to the spring and to the grading box assembly. In some forms of the tow-behind grading tool the second frame location is rearward of the third frame location. In some forms of the tow-behind grading tool the grading box assembly comprises a top member, a drag bar coupled with and extending downward from the top member, first and second side members extending forward from the drag bar and extending downward from the top member, a front member coupled with the top member and a plurality of ripping teeth. In some forms of the tow-behind grading tool the top member is provided with openings through which loosened ground material can pass.

Another embodiment is an apparatus comprising: a frame extending between a forward frame location and a rearward frame location; a ground contacting member rotatably coupled with the frame; a lever rotatably coupled with the frame at a first location intermediate the forward frame location and the rearward frame location, the lever including a first arm extending forward from a fulcrum at the first frame location a second arm extending rearward from the fulcrum; a first adjustment mechanism rotatably coupled with the frame at a second location intermediate the forward frame location and the rearward frame location, rotatably coupled with the first adjustment mechanism and being adjustable to apply force to rotate the lever relative to the frame; a suspension rotatably coupled with the second arm of the lever, the suspension including a spring operably coupled with the lever; a grading box rotatably coupled with the frame at a third frame location intermediate the forward frame location and the rearward frame location and rotatably coupled with the suspension, the spring being deformable to accommodate relative motion between the lever and the grading box; a second adjustment mechanism coupled with the frame, coupled with the grading box and being adjustable to selectably increase and decrease in length effective to vary the pitch of the grading box relative to the frame; a fixation member coupled with the grading box and engageable with the frame to selectably vertically fix a first side of the grading box relative to the frame while allowing movement of a second side of the of the grading box relative to the frame.

In some forms of the apparatus, with the fixation member coupled with the frame, adjustment of the length of the first adjustment mechanism is effective to vary a side-to-side roll of the grading box. In some forms of the apparatus the suspension comprises a shaft rotatably coupled with the grading box, a slot provided in the shafts, a moveable collar moveable along a length of the shaft, a spring disposed along the shaft, and a lateral member passing through an opening in the moveable collar, passing through the slots and rotatably coupled with the lever, and adjustment of the length of the first adjustment mechanism to vary a side-to-side roll of the grading box is effective to move rotate the lateral member relative to the shaft and the slot effective to change the angle of the lateral member relative to the underlying ground surface. In some forms of the apparatus adjustment of the length of the first adjustment mechanism over a first range is effective to raise and lower the grading box relative to the underlying ground surface from a first position wherein the grading box is spaced apart from the underlying ground surface to a second position wherein the grading box contacts the underlying ground surface. In some forms of the apparatus adjustment of the length of the first adjustment mechanism over a second range is effective to compress the spring of the suspension assembly.

A further embodiment is a method comprising: operating a grading tool in a first state of adjustment by advancing the grading tool over an underlying ground surface effective to work the underlying ground surface toward a first grade, the grading tool and the first state of adjustment comprising a frame extending between a forward frame location and a rearward frame location, a ground contacting member coupled with the frame, a lever coupled with the frame at a first location intermediate the forward frame location and the rearward frame location, the lever including a first arm extending forward from a fulcrum at the first frame location and a second arm extending rearward from the fulcrum, a first adjustment mechanism coupled with the frame at a second location intermediate the forward frame location and the rearward frame location, coupled with the first arm and being adjusted to position the lever in a first adjustment position, a suspension coupled with the second arm of the lever, the suspension including a spring mechanism operably coupled with the lever, a grading box coupled with the frame at a third frame location intermediate the forward frame location and the rearward frame location and coupled with the suspension, the spring mechanism being deformable to accommodate relative motion between the lever and the grading box, a second adjustment mechanism coupled with the frame, coupled with the grading box and being adjusted to a second length effective to position the grading box at a first pitch relative to the frame, a fixation member coupled with the grading box and being disengaged from the frame allowing first and second sides of the grading box to move vertically relative to the frame; adjusting the grading tool to a second state of adjustment wherein the fixation member is engaged with the frame to maintain the first side of the grading box vertically stationary relative to the frame while allowing vertical movement of a second side of the of the grading box relative to the frame and adjustment of the pitch of the grading box relative to the frame; and operating the grading tool in a second state of adjustment by advancing the grading tool over the underlying ground surface effective to work the underlying ground surface toward a second grade being different from the first grade.

Some forms of the method comprise adjusting the grading tool to a third state of adjustment wherein the first adjustment mechanism is adjusted to position the lever in a second adjustment position effective to lower the grading box relative from a first position wherein the grading box is spaced apart from the underlying ground surface to a second position wherein the grading box contacts the underlying ground surface. Some forms of the method comprise adjusting the grading tool to a fourth state of adjustment wherein the first adjustment mechanism is adjusted to position the lever in a third adjustment position effective to compress the spring of the suspension assembly and increase force applied to the underlying ground surface by the grading box. Some forms of the method comprise adjusting the first adjustment mechanism to position the lever in a third adjustment position is effective to apply a combined weight of a work machine towing the grading tool and an operator positioned on the work machine to compress the spring and increase the force applied to the underlying ground surface. Some forms of the method comprise adjusting the grading tool to a fifth state of adjustment by adjusting the length of the second adjustment mechanism effective to position the grading box at a second pitch relative to the frame, the second pitch being different from the first pitch.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A tow-behind grading tool comprising:
a frame extending between a hitch coupled with the frame at a forward frame location and a ground contacting member rotatably coupled with the frame at a rearward frame location;
a first adjustment mechanism rotatably coupled with the frame at a first frame location intermediate the forward frame location and the rearward frame location and being adjustable to increase and decrease in length;
a lever rotatably coupled with the frame at a second frame location intermediate the first frame location and the rearward frame location, the lever including a first arm extending from a fulcrum at the second frame location and rotatably coupled with the first adjustment mechanism and a second arm extending from the fulcrum;
a suspension assembly rotatably coupled with the second arm of the lever, the suspension assembly including a spring operably coupled with the lever;
a grading box assembly rotatably coupled with the frame at a third frame location intermediate the forward frame location and the rearward frame location and rotatably coupled with the suspension assembly, the spring being compressible to accommodate relative motion between the lever and the grading box assembly;
a second adjustment mechanism coupled with the frame, coupled with the grading box assembly and being adjustable to selectably increase and decrease in length effective to vary front-to-rear pitch of the grading box assembly relative to the frame;
a fixation member coupled with the grading box assembly and engageable with the frame to selectably fix a first side of the grading box assembly vertically relative to the frame while allowing vertical movement of a second side of the of the grading box assembly relative to the frame;
wherein, with the ground contacting member in contact with an underlying ground surface and the fixation member coupled with the frame, adjustment of the length of the first adjustment mechanism is effective to vary a side-to-side roll of the grading box assembly.

2. The tow-behind grading tool of claim 1 wherein with the ground contacting member in contact with an underlying ground surface, adjusting the length of the first adjustment mechanism over a first range is effective to raise and lower the grading box assembly relative to the underlying ground surface from a first position wherein the grading box assembly is spaced apart from the underlying ground surface to a second position wherein the grading box assembly contacts the underlying ground surface.

3. The tow-behind grading tool of claim 2 wherein, with the ground contacting member in contact with an underlying ground surface and the grading box assembly in contact with the underlying ground surface, adjusting the length of the first adjustment mechanism over a second range is effective to compress the spring of the suspension assembly.

4. The tow-behind grading tool of claim 3 wherein adjusting the length of the first adjustment mechanism over a second range to compress the spring is effective to apply upward force to the hitch.

5. The tow behind grading tool of claim 4 wherein during towing by a work machine carrying an operator, the upward force on the hitch is effective transfer weight of the work machine and weight of the operator to downward force applied to the spring and to the grading box assembly.

6. The tow-behind grading tool of claim 1 wherein the second frame location is rearward of the third frame location.

7. The tow-behind grading tool of claim 1 wherein the grading box assembly comprises a top member, a drag bar coupled with and extending downward from the top member, first and second side members extending forward from the drag bar and extending downward from the top member, a front member coupled with the top member and a plurality of ripping teeth.

8. The tow-behind grading tool of claim 7 wherein the top member is provided with openings through which loosened ground material can pass.

9. The tow-behind grading tool of claim 1 wherein the suspension comprises first and second shafts rotatably coupled with the grading box assembly, first and second slots provided in the first and second shafts respectively, first and second moveable collars moveable along a length of the first and second shafts respectively, first and second springs surrounding the first and second shafts respectively, and a lateral member passing through openings in the first and second moveable collars, passing through the first and second slots and rotatably coupled with the lever.

10. A tow-behind grading tool comprising:
a frame extending between a hitch coupled with the frame at a forward frame location and a ground contacting member rotatably coupled with the frame at a rearward frame location;
a first adjustment mechanism rotatably coupled with the frame at a first frame location intermediate the forward frame location and the rearward frame location and being adjustable to increase and decrease in length;
a lever rotatably coupled with the frame at a second frame location intermediate the first frame location and the rearward frame location, the lever including a first arm extending from a fulcrum at the second frame location and rotatably coupled with the first adjustment mechanism and a second arm extending from the fulcrum;
a suspension assembly rotatably coupled with the second arm of the lever, the suspension assembly including a spring operably coupled with the lever;
a grading box assembly rotatably coupled with the frame at a third frame location intermediate the forward frame location and the rearward frame location and rotatably coupled with the suspension assembly, the spring being compressible to accommodate relative motion between the lever and the grading box assembly;
a second adjustment mechanism coupled with the frame, coupled with the grading box assembly and being adjustable to selectably increase and decrease in length effective to vary front-to-rear pitch of the grading box assembly relative to the frame;
a fixation member coupled with the grading box assembly and engageable with the frame to selectably fix a first side of the grading box assembly vertically relative to the frame while allowing vertical movement of a second side of the of the grading box assembly relative to the frame;
wherein the suspension comprises first and second shafts rotatably coupled with the grading box assembly, first and second slots provided in the first and second shafts respectively, first and second moveable collars moveable along a length of the first and second shafts respectively, first and second springs surrounding the first and second shafts respectively, and a lateral member passing through openings in the first and second moveable collars, passing through the first and second slots and rotatably coupled with the lever.

11. The tow-behind grading tool of claim 10 wherein, with the ground contacting member in contact with an underlying ground surface and the fixation member coupled with the frame, adjustment of the length of the first adjustment mechanism is effective to vary a side-to-side roll of the grading box assembly.

12. The tow-behind grading tool of claim 10 wherein with the ground contacting member in contact with an underlying ground surface, adjusting the length of the first adjustment mechanism over a first range is effective to raise and lower the grading box assembly relative to the underlying ground surface from a first position wherein the grading box assembly is spaced apart from the underlying ground surface to a second position wherein the grading box assembly contacts the underlying ground surface.

13. The tow-behind grading tool of claim 12 wherein, with the ground contacting member in contact with an underlying ground surface and the grading box assembly in contact with the underlying ground surface, adjusting the length of the first adjustment mechanism over a second range is effective to compress the spring of the suspension assembly.

14. The tow-behind grading tool of claim 13 wherein adjusting the length of the first adjustment mechanism over a second range to compress the spring is effective to apply upward force to the hitch.

15. The tow behind grading tool of claim 14 wherein during towing by a work machine carrying an operator, the upward force on the hitch is effective transfer weight of the work machine and weight of the operator to downward force applied to the spring and to the grading box assembly.

16. The tow-behind grading tool of claim 10 wherein the second frame location is rearward of the third frame location.

17. An apparatus comprising:
a frame extending between a forward frame location and a rearward frame location;
a ground contacting member rotatably coupled with the frame;
a lever rotatably coupled with the frame at a first location intermediate the forward frame location and the rearward frame location, the lever including a first arm extending forward from a fulcrum at the first frame location a second arm extending rearward from the fulcrum;
a first adjustment mechanism rotatably coupled with the frame at a second location intermediate the forward frame location and the rearward frame location, rotatably coupled with the first adjustment mechanism and being adjustable to apply force to rotate the lever relative to the frame;

a suspension rotatably coupled with the second arm of the lever, the suspension including a spring operably coupled with the lever;

a grading box rotatably coupled with the frame at a third frame location intermediate the forward frame location and the rearward frame location and rotatably coupled with the suspension, the spring being deformable to accommodate relative motion between the lever and the grading box;

a second adjustment mechanism coupled with the frame, coupled with the grading box and being adjustable to selectably increase and decrease in length effective to vary the pitch of the grading box relative to the frame;

a fixation member coupled with the grading box and engageable with the frame to selectably vertically fix a first side of the grading box relative to the frame while allowing movement of a second side of the of the grading box relative to the frame;

wherein, with the fixation member coupled with the frame, adjustment of the length of the first adjustment mechanism is effective to vary a side-to-side roll of the grading box.

18. The apparatus of claim 17 wherein the suspension comprises a shaft rotatably coupled with the grading box, a slot provided in the shafts, a moveable collar moveable along a length of the shaft, a spring disposed along the shaft, and a lateral member passing through an opening in the moveable collar, passing through the slots and rotatably coupled with the lever, and adjustment of the length of the first adjustment mechanism to vary a side-to-side roll of the grading box is effective to move rotate the lateral member relative to the shaft and the slot effective to change the angle of the lateral member relative to the underlying ground surface.

19. The apparatus of claim 17 adjustment of the length of the first adjustment mechanism over a first range is effective to raise and lower the grading box relative to the underlying ground surface from a first position wherein the grading box is spaced apart from the underlying ground surface to a second position wherein the grading box contacts the underlying ground surface.

20. The apparatus of claim 19 wherein adjustment of the length of the first adjustment mechanism over a second range is effective to compress the spring of the suspension assembly.

* * * * *